United States Patent
Abe et al.

(10) Patent No.: US 8,070,874 B2
(45) Date of Patent: *Dec. 6, 2011

(54) SURFACE-MODIFIED TITANIUM DIOXIDE PARTICLE AND METHOD FOR PRODUCING THE SAME

(75) Inventors: Kazunobu Abe, Osaka (JP); Kazumi Sugimoto, Osaka (JP); Atsuki Terabe, Osaka (JP); Masaru Mikami, Osaka (JP)

(73) Assignee: Sakai Chemical Industry, Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/823,815

(22) Filed: Jun. 25, 2010

(65) Prior Publication Data

US 2010/0326323 A1 Dec. 30, 2010

(30) Foreign Application Priority Data

Jun. 26, 2009 (JP) ................................. 2009-152070

(51) Int. Cl.
*C09C 1/36* (2006.01)
*C09C 3/06* (2006.01)
*B05D 5/06* (2006.01)

(52) U.S. Cl. ......................... 106/449; 423/598; 427/218
(58) Field of Classification Search .................. 106/449; 423/598; 427/218
See application file for complete search history.

(56) References Cited

U.S. PATENT DOCUMENTS

| | | | |
|---|---|---|---|
| 4,036,662 A * | 7/1977 | Rademachers et al. ....... | 106/430 |
| 5,665,466 A * | 9/1997 | Guez et al. ..................... | 428/329 |
| 5,981,425 A * | 11/1999 | Taoda et al. .................... | 502/208 |
| 6,126,915 A * | 10/2000 | Tunashima et al. ............. | 423/608 |
| 6,383,980 B1 * | 5/2002 | Hagihara et al. ............... | 502/340 |
| 7,662,358 B2 * | 2/2010 | Auer et al. ..................... | 423/598 |
| 2008/0268148 A1 * | 10/2008 | Prochazka et al. ............. | 427/215 |
| 2009/0253571 A1 * | 10/2009 | Hashimoto et al. ........... | 501/138 |
| 2009/0264276 A1 * | 10/2009 | Yamashita et al. ............. | 501/138 |
| 2010/0166641 A1 * | 7/2010 | Abe et al. ....................... | 423/598 |

FOREIGN PATENT DOCUMENTS

| JP | 7-292276 | | 11/1995 |
|---|---|---|---|
| JP | 7-292277 | | 11/1995 |
| JP | 10-305230 A | * | 11/1998 |

* cited by examiner

*Primary Examiner* — Anthony Green
(74) *Attorney, Agent, or Firm* — Hamre, Schumann, Mueller & Larson, P.C.

(57) ABSTRACT

The invention provides a surface-modified titanium dioxide particle inhibited in photocatalytic activity and reduced in amount of volatile water. The surface-modified titanium dioxide particle has on the surface a crystalline composite compound of at least one of alkaline earth metals selected from magnesium, calcium, barium and strontium complexed with titanium dioxide in an amount of 0.1-20% by weight based on the weight of the surface-modified titanium dioxide particle in terms of oxide of the alkaline earth metal. The surface-modified titanium dioxide particle is produced by heating a compound of an alkaline earth metal and a titanium dioxide particle at a temperature of 60° C. or higher so that the alkaline earth metal is complexed with titanium dioxide to form a crystalline composite compound on the surface of the titanium dioxide particle in an amount of 0.1-20% by weight based on the weight of the surface-modified titanium dioxide particle in terms of oxide of the alkaline earth metal.

3 Claims, 8 Drawing Sheets

SURFACE-MODIFIED TITANIUM DIOXIDE PARTICLE AND METHOD FOR PRODUCING THE SAME

FIELD OF THE INVENTION

The present invention relates to a surface-modified titanium dioxide particle which has on the surface thereof a crystalline composite compound formed by complexing an alkaline earth metal with titanium dioxide, and which is hence inhibited in photocatalytic activity and reduced in amount of volatile water, and is suitable for use as a pigment in paint compositions and resin compositions which require high weather resistance.

In particular, the invention relates to a surface-modified titanium dioxide particle which, when it is used as a pigment in a paint composition, provides the paint composition with a higher tinting strength than a conventional titanium dioxide particle having on the surface thereof a non-crystalline or amorphous composite compound. The invention further relates to a method for producing such a surface-modified titanium dioxide particle.

BACKGROUND ART

Titanium dioxide particles are known as a white pigment, ultraviolet ray shielding agent and the like, and in wide use for paint products, coloring agents for plastics products and so on. However, the titanium dioxide particles have photocatalytic activity so that paint compositions or resin compositions containing such titanium dioxide particles suffer gloss deterioration, chalking, discoloration or the like with time. Furthermore, the titanium dioxide particles hydrolyze resins with volatile water which the particles contain.

Therefore, it has been conventionally proposed that the surface of titanium dioxide particle is modified or treated with a hydrous oxide of silicon, aluminum, zirconium or the like to inhibit the photocatalytic activity of titanium dioxide particle to prevent oxidative decomposition of resins (for example, see Japanese Unexamined Patent Publication Nos. 7-292276 and 7-292277). However, a large amount of surface modification is required to inhibit the photocatalytic activity of titanium dioxide particle, and such a large amount of surface modification causes a problem that it increases the amount of volatile water which titanium dioxide particle contains, resulting in promoting the hydrolysis of resin when it is blended with the resin. Accordingly, the amount of surface modification of titanium dioxide particle must be reduced if the amount of volatile water is to be reduced, but when the amount of surface modification is reduced, the photocatalytic activity of titanium dioxide particle cannot be sufficiently inhibited.

No technique has hitherto been known which is capable of simultaneously inhibiting the photocatalytic activity of titanium dioxide particle and the amount of volatile water by surface modification of titanium dioxide particle.

The invention has been completed to solve the above mentioned problems associated with the photocatalytic activity of titanium dioxide particle.

Therefore, it is an object of the invention to provide a surface-modified titanium dioxide particle which has on the surface thereof a crystalline composite compound formed by complexing an alkaline earth metal with titanium dioxide, and which is hence inhibited in photocatalytic activity and reduced in amount of volatile water, and is suitable for use in paint compositions and resin compositions which require high weather resistance.

In particular, it is an object of the invention to provide a surface-modified titanium dioxide particle which, when it is used as a pigment in a paint composition, provides the paint composition with a higher tinting strength than a conventional titanium dioxide particle having on the surface thereof a non-crystalline or amorphous composite compound.

It is a further object of the invention to provide a method for producing such a surface-modified titanium dioxide particle.

SUMMARY OF THE INVENTION

The invention provides a surface-modified titanium dioxide particle which has on the surface a crystalline composite compound of at least one of alkaline earth metals selected from magnesium, calcium, barium and strontium complexed with titanium dioxide in an amount of 0.1-20% by weight based on the weight of the surface-modified titanium dioxide particle in terms of oxide of the alkaline earth metal.

In particular, the invention provides a surface-modified titanium dioxide particle having on the surface thereof a crystalline composite compound of at least one of alkaline earth metals selected from magnesium, calcium, barium and strontium complexed with titanium dioxide in an amount of 0.1-20% by weight based on the weight of the surface-modified titanium dioxide particle in terms of oxide of the alkaline earth metal, wherein the crystalline composite compound is formed by heating a compound of the alkaline earth metal and a titanium dioxide particle at a temperature of 60° C. or higher so that the alkaline earth metal is complexed with titanium dioxide to form the crystalline composite compound on the surface of the titanium dioxide particle.

The invention also provides a method for producing a surface-modified titanium dioxide particle which comprises heating a compound of at least one of alkaline earth metals selected from magnesium, calcium, barium and strontium and a titanium dioxide particle at a temperature of 60° C. or higher so that the alkaline earth metal is complexed with titanium dioxide to form a crystalline composite compound on the surface of the titanium dioxide particle in an amount of 0.1-20% by weight based on the weight of the surface-modified titanium dioxide particle in terms of oxide of the alkaline earth metal.

The surface-modified titanium dioxide particle of the invention has on the surface thereof a crystalline composite compound of at least one of alkaline earth metals selected from magnesium, calcium, barium and strontium complexed with titanium dioxide in an amount of 0.1-20% by weight based on the weight of the surface-modified titanium dioxide particle in terms of oxide of the alkaline earth metal. Therefore, the surface-modified titanium dioxide particle of the invention is inhibited in photocatalytic activity and reduced in amount of volatile water, and is suitable for use in paint compositions and resin compositions which require high weather resistance. For example, when the surface-modified titanium dioxide particle of the invention is used as a pigment in a paint composition, it provides the paint composition with a higher tinting strength than a conventional titanium dioxide particle having on the surface thereof a non-crystalline or amorphous composite compound.

DESCRIPTION OF EMBODIMENTS

The surface-modified titanium dioxide particle of the invention has on the surface thereof a crystalline composite compound of at least one of alkaline earth metals selected from magnesium, calcium, barium and strontium complexed with titanium dioxide in an amount of 0.1-20% by weight based on the weight of the surface-modified titanium dioxide particle in terms of oxide of the alkaline earth metal.

Preferably the surface-modified titanium dioxide particle of the invention has on the surface thereof a crystalline composite compound of at least one of alkaline earth metals selected from magnesium, calcium, barium and strontium complexed with titanium dioxide in an amount of 0.1-20% by weight based on the weight of the surface-modified titanium dioxide particle in terms of oxide of the alkaline earth metal, wherein the crystalline composite compound is formed by heating a compound of the alkaline earth metal and a titanium dioxide particle at a temperature of 60° C. or higher so that the alkaline earth metal is complexed with titanium dioxide to form the crystalline composite compound on the surface of the titanium dioxide particle.

Such a surface-modified titanium dioxide particle is produced according to the invention by heating a compound of at least one of alkaline earth metals selected from magnesium, calcium, barium and strontium and a titanium dioxide particle at a temperature of 60° C. or higher so that the alkaline earth metal is complexed with the titanium dioxide to form a crystalline composite compound on the surface of the titanium dioxide particle in an amount of 0.1-20% by weight based on the weight of the surface-modified titanium dioxide particle in terms of weight of oxide of the alkaline earth metal.

In the method for producing a surface-modified titanium dioxide particle according to the invention, the manufacturing method, and shape, crystal form and particle diameter of titanium dioxide particles used as a starting material are not specifically limited. For example, titanium dioxide particles used as a starting material may be produced either by a sulfuric acid method or by a chlorine method. The raw material of titanium dioxide is not specifically limited and may be metatitanic acid or titanium tetrachloride. Furthermore, the shape of titanium dioxide particles used as a starting material may be spherical or acicular, and the crystal form may be rutile or anatase.

The particle size of titanium dioxide particles used as a starting material may also be properly selected depending on an application and demand characteristics. For example, titanium dioxide particles generally used for paint compositions, resin compositions or the like have a primary particle diameter of 0.1 to 0.5 μm measured by any method such as an electron microscope method, a specific surface area method or an X-ray diffraction method. On the other hand, visible light responsible ultrafine particles for ultraviolet ray shielding generally have a primary particle diameter of 0.01 to 0.1 μm.

When the surface-modified titanium dioxide particle of the invention is to be used in paint, resin or the like, it is preferred that titanium dioxide particles used as a starting material generally have an average primary particle diameter ranging from 0.1 to 0.5 μm.

Furthermore, the primary particles of titanium dioxide particles used as a starting material are not specifically limited and may contain, depending on an application and demand characteristics, elements other than titanium, for example, alkali metals, alkaline earth metals, aluminum, silicon, phosphorus, sulfur, zinc, tin, antimony, various transition metals such as zirconium and manganese, and various rare earth elements such as yttrium and lanthanum, for example, in the form of a compound or solid solution.

As mentioned above, a compound of at least one of alkaline earth metals selected from magnesium, calcium, barium and strontium and a titanium dioxide particle are heated so that the alkaline earth metal is complexed with titanium dioxide to form a crystalline composite compound on the surface of the titanium dioxide particle, thereby the surface-modified titanium dioxide particle of the invention is obtained. The compound of alkaline earth metal used is not specifically limited, but hydroxides are generally preferable examples of the compound of alkaline earth metal used. Furthermore, water soluble salts such as chlorides or nitrates are also preferable examples of the compound of alkaline earth metal. When such water soluble salts are used as the compound of alkaline earth metal, they are preferably used in combination with an alkali metal hydroxide such as sodium hydroxide or an alkaline earth metal hydroxide such as magnesium hydroxide. The combinational use of the water soluble salt of alkaline earth metal with the alkali metal hydroxide or alkaline earth metal hydroxide makes reaction conditions alkaline, so that the complexing reaction of alkaline earth metal and titanium dioxide can be accelerated. Accordingly, for example, a reaction temperature can be lowered or a reaction time can be shortened.

Furthermore, when a compound of at least one of alkaline earth metals and a titanium dioxide particle are heated, they may be heated either by using a solid phase method wherein a dry mixture of a compound of an alkaline earth metal and a titanium dioxide particle are heated together, or by using a wet method wherein a compound of an alkaline earth metal and a titanium dioxide particle are heated together in a suitable solvent.

When the wet method is employed, a compound of an alkaline earth metal and a titanium dioxide particle may be heated in a suitable solvent, for example, at ordinary pressure usually in water at a temperature of 100° C. or less, or may be heated hydrothermally under elevated pressure usually in the presence of water at a temperature higher than 100° C. In either case where a compound of an alkaline earth metal and a titanium dioxide particle are heated at ordinary pressure or under hydrothermal conditions, water is usually used as a preferred solvent, as mentioned above. However, aqueous solutions of alcohols or other water soluble organic compounds may also be used as a solvent.

According to the invention, a compound of an alkaline earth metal and a titanium dioxide particle is heated at a temperature of 60° C. or higher. When the heating temperature is less than 60° C., the alkaline earth metal cannot be sufficiently complexed with titanium dioxide on the surface of the titanium dioxide particle so that the desired surface-modified titanium dioxide particle having inhibited photocatalytic activity cannot be obtained. The upper limit of temperature for heating a compound of an alkaline earth metal and a titanium dioxide particle is not specifically limited, but when the solid phase method is used, it is generally about 1200° C. In turn, when the wet method, in particular, the hydrothermal method is employed, it is generally about 300° C. because the higher heating temperature needs a more complicated and expensive reaction apparatus.

In particular, when the solid phase method is used, the heating temperature is preferably in a range from 600 to 1200° C. When the wet method is used, in the case that water is used as a solvent at ordinary pressure, the heating temperature is preferably in a range from 60 to 100° C., and in the case of the hydrothermal method is used, the heating temperature is preferably in a range from 110 to 300° C.

According to the invention, the appropriate selection of the reaction conditions, for example, the kind and amount of a compound of an alkaline earth metal used and the temperature, pressure and time while heating the compound of the alkaline earth metal and a titanium dioxide particle makes it possible to control the amount of the alkaline earth metal complexed with titanium dioxide on the surface of the titanium dioxide particle.

In this manner, a compound of an alkaline earth metal compound and a titanium dioxide particle are heated and reacted so that the alkaline earth metal is complexed with titanium dioxide to form a crystalline composite compound on the surface of the titanium dioxide particle. Then the obtained reaction product is washed with water to remove an excess amount of compound of the alkaline earth metal, and then dried and pulverized thereby providing the surface-modified titanium dioxide particle of the invention.

According to the invention, the amount of an alkaline earth metal carried on the thus obtained surface-modified titanium dioxide particle is in a range from 0.1 to 20% by weight, preferably in a range from 1 to 10% by weight, based on the weight of the thus obtained surface-modified titanium dioxide particle in terms of oxide of the alkaline earth metal. When the amount of an alkaline earth metal is less than 0.1% by weight based on the weight of the thus obtained surface-modified titanium dioxide particle in terms of oxide of the alkaline earth metal, the photocatalytic activity of the obtained surface-modified titanium dioxide particle is not sufficiently inhibited. On the other hand, when the amount of the alkaline earth metal is more than 20% by weight based on the weight of the thus obtained surface-modified titanium dioxide particle in terms of oxide of the alkaline earth metal, the content of titanium dioxide in the obtained surface-modified titanium dioxide particle is relatively reduced so that if such a surface-modified titanium dioxide particle is used, for example, in a paint composition, it fails to provide a paint composition having high tinting strength.

A fluorescent X-ray analysis shows that the surface-modified titanium dioxide particle thus obtained according to the invention contains an alkaline earth metal element, and a scanning electron microphotograph shows that the surface-modified titanium dioxide particle has titanium element in the core and has an alkaline earth metal element on the surface.

Furthermore, an X-ray diffraction analysis shows that the surface-modified titanium dioxide particle of the invention has an X-ray diffraction pattern of titanium dioxide as well as an X-ray diffraction pattern of a crystalline composite compound of an alkaline earth metal and titanium dioxide, namely, a crystalline composite oxide containing an alkaline earth metal element and titanium element. For example, when titanium dioxide particles are treated with barium hydroxide as a compound of an alkaline earth metal, the resulting surface-modified titanium dioxide particle has barium titanate ($BaTiO_3$) and barium orthotitanate ($Ba_2TiO_4$) as crystalline composite oxides formed by complexing the alkaline earth metal with titanium dioxide on the surface of the titanium dioxide particles.

The surface-modified titanium dioxide particle of the invention has on the surface a crystalline composite compound formed by complexing an alkaline earth metal with titanium dioxide, and is inhibited in photocatalytic activity as well as reduced in amount of volatile water. Consequently, it can be suitably used for a paint composition or resin composition requiring high weather resistance. A paint composition or resin composition containing the surface-modified titanium dioxide particle of the invention has much improved weather resistance as compared with a paint composition or resin composition containing a conventional titanium dioxide particle as a pigment.

Furthermore, the surface-modified titanium dioxide particle of the invention provides, when it is used as a pigment in a paint composition, the paint composition with a higher tinting strength than a conventional surface-modified titanium dioxide particle having on the surface amorphous composite compounds.

As necessary, the surface-modified titanium dioxide particle of the invention may be further subjected to conventionally known surface treatments with inorganic compounds or organic compounds in addition to the complexing on the surface thereof of an alkaline earth metal with titanium dioxide as described above. Examples of such conventional surface treatment with inorganic compounds include a surface treatment with a hydrous oxide of silicon, aluminum, zirconium or the like.

Suitable application examples of the surface-modified titanium dioxide particle of the invention include, but are not limited to, a pigment component for a paint composition whose resin component is polyester resin, urethane resin, alkyd resin, acrylic resin, melamine resin, fluorine resin or the like.

Further suitable application examples of the surface-modified titanium dioxide particle of the invention include, but are not limited to, a pigment component for thermoplastic resins such as polyolefin resin, polyester resin, polystyrene resin, polyamide resin, polycarbonate resin and ABS resin and for thermosetting resins such as melamine resin, epoxy resin and alkyd resin.

EXAMPLES

The invention will be explained with reference to examples, but the invention is not intended to be limited to the examples.

The amount of alkaline earth metal contained in the surface-modified titanium dioxide particle, the crystal structure of the surface-modified titanium dioxide particle, and amount of volatile water contained in the surface-modified titanium dioxide particle obtained in each of Examples and Comparative Examples were measured in the following manner.

Furthermore, the surface-modified titanium dioxide particle obtained in each of Examples and Comparative Examples was mixed with a paint composition to examine the weather resistance (gloss retention of coating) in the following manner, and a polyethylene film containing the surface-modified titanium dioxide particle obtained in each of Examples and Comparative Examples was also prepared to examine the surface property in the following manner. In addition, a polyethylene terephthalate sheet containing the surface-modified titanium dioxide particle obtained in each of Examples and Comparative Examples was prepared to examine the light fastness in the following manner. The results are shown in Tables 1 and 2.

(Amount of Alkaline Earth Metal Contained in Surface-Modified Titanium Dioxide Particle)

The amount of an alkaline earth metal contained in the surface-modified titanium dioxide particle obtained was determined in terms of oxide of the alkaline earth metal using a fluorescence X-ray analyzer (ZSX primus II manufactured by Rigaku Corporation).

(Crystal Structure of Composite Compound)

The crystal structure of the surface-modified titanium dioxide particle obtained in each of Examples and Comparative Examples was analyzed with a X-ray diffractometer (RINT 2200 manufactured by Rigaku Corporation) to examine the presence of the peak derived from titanium dioxide and the peak derived from the composite compound of titanium dioxide and an alkaline earth metal.

(Amount of Volatile Water)

A predetermined amount of the surface-modified titanium dioxide particles was heated and dehydrated at 105° C. for 2 hours with an electric furnace, and the weight ($W_1$) was measured. Then, the particles were heated again at 900° C. for 1 hour, and the weight ($W_2$) was measured. The amount of volatile water was calculated from the following formula:

Amount of volatile water=$\{(W_1-W_2)/W_1\} \times 100 (\%)$ (Surface Property of Film)

30% by weight of surface-modified titanium dioxide particles was blended with 70% by weight of polyethylene resin (Sumikathene F412-1 manufactured by Sumitomo Chemical Co., Ltd.). The mixture was heated and kneaded with a Labo Plastomill single screw extruder (manufactured by Toyo Seiki Seisaku-Sho, Ltd., a shaft length of 20 mm) and then molded with a T die molding machine (manufactured by Toyo Seiki Seisaku-Sho, Ltd.) at a molding temperature of 300° C. to obtain a film having a thickness of 30 μm.

The surface property of the film was evaluated by visually observing whether lacing or the like is found on the surface of the film. Evaluation was "A" when little lacing, foaming or the like was observed, and evaluation was "B" when marked lacing, foaming or the like was observed. "Lacing" means molding defect in which a volatile component such as water in titanium dioxide contained in a resin composition as a pigment volatilizes while film forming to form lacy holes in the obtained film. When the amount of a volatile component is large in a titanium dioxide particle contained in a resin composition, such lacing easily occurs in the obtained film.

(Light Fastness of Resin Composition)

2% by weight of surface-modified titanium dioxide particles obtained in each of Examples and Comparative Examples was blended with 98% by weight of polyethylene terephthalate resin (TR-8550T manufactured by Teijin Chemicals Ltd.). The mixture was heated and kneaded with an injection molding machine (SH-50 manufactured by Sumitomo Heavy Industries, Ltd.) to mold a sheet having a thickness of 3.0 mm. The sheet was exposed to ultraviolet irradiation for 48 hours with a fade meter (manufactured by Suga Test Instruments Co., Ltd.), and the difference of brightness W (ΔW) between an irradiated part and an unirradiated part was measured by using a colorimeter (SE 2000 manufactured by Nippon Denshoku Industries Co., Ltd.).

In the above measurement, the brightness W in the Lab color system was calculated from the following formula:

$W=100-\{(100-L)^2+a^2+b^2\}^{1/2}$ wherein L is lightness, a is saturation, and b is hue.

(Weather Resistance of Paint Composition)

Using surface-modified titanium dioxide particles obtained in each of Examples and Comparative Examples, and a mixture of polyester resin and melamine resin (M6602 and J820, respectively, manufactured by Dainippon Ink And Chemicals, Inc.), a paint composition having a titanium dioxide weight concentration of 37.5% was prepared. The paint was applied on a bonderized steel sheet with a bar coater Rod No. 60. The plate was then baked at 150° C. for 30 minutes using a dryer (manufactured by Toyo Engineering Works, Ltd.). The painted plate was subjected to accelerated exposure test with a sunshine weather meter using carbon arc (manufactured by Suga Test Instruments Co., Ltd.). The condition was a rainfall period of 12 minutes in a 60 minutes carbon arc irradiation period.

An initial gloss before exposure test and a gloss after 800 hours exposure were measured at 60° with a gloss meter (manufactured by Murakami Color Research Laboratory), and the weather resistance was evaluated as gloss retention with respect to the initial gloss. The gloss retention was calculated from the following formula:

Gloss retention=(gloss after 800 hours exposure)/(initial gloss before exposure test)

(Tinting Strength of Surface-Modified Titanium Dioxide Particle)

A mixture composed of 5000 parts by weight of low density polyethylene resin (Sumikathene F412-1 manufactured by Sumitomo Chemical Co., Ltd.), 100 parts by weight of surface-modified titanium dioxide particle obtained in each of Examples and Comparative Examples and one part by weight of carbon black (MA-100 manufactured by Mitsubishi Chemical Corporation) was melted and kneaded at 110° C. with a test roll mill (NS-90 manufactured by Nishimura Machinery Co., Ltd.), and then molded into a sheet having a thickness of 0.5 mm with a hydraulic molding machine (TBD-30-2 manufactured by Toho Machinery Co., Ltd.).

Lightness L in the Lab color system of each sheet obtained was measured with a colorimeter (SE2000 manufactured by Nippon Denshoku Industries Co., Ltd), and the differences of lightness (ΔL) between the sheet using the surface-modified titanium dioxide particle according to Example 1 and the sheets using the surface-modified titanium dioxide particle according to the other Examples and Comparative Examples were calculated. Then, letting the lightness of the sheet using the surface-modified titanium dioxide particle according to Example 1 be 100, the tinting strength of surface-modified titanium dioxide particle in each of the other sheets was calculated from the following formula:

Tinting strength=100+ΔL×100

(Average Primary Particle Diameter of Titanium Dioxide Particle Used as Starting Material)

1000 titanium dioxide particles were subjected to measurement of unidirectional particle diameter using transmission electron microphotography, and the average value was taken as the average primary particle diameter of titanium dioxide particles.

A. Production of Surface-Modified Anatase Titanium Dioxide Particle and its Performance Example 1

75 g of anatase titanium dioxide having an average primary particle diameter of 0.15 μm and 48 g of barium hydroxide octahydrate were added to water to make a total volume of 750 mL. The mixture was placed in an autoclave having an internal volume of 1 L and reacted with thorough stirring at a temperature of 150° C. and a pressure of 0.4 MPa for 5 hours.

The resulting aqueous slurry containing the reaction product obtained was adjusted to pH 5.5 with aqueous acetic acid, filtered using a Buchner funnel to remove excess alkaline earth metal ions, and then washed with water until the conductivity of filtrate became 100 μS or lower to remove remaining water soluble salts. The cake obtained in this manner was dried at 105° C. to remove water, and then pulverized using a jet mill to obtain surface-modified titanium dioxide particles.

The surface-modified titanium dioxide particle obtained in this manner was covered with epoxy resin, the particle was cut down with a cross-section sample preparation equipment, and the cross section was observed under a scanning electron microscope (SEM) to obtain an electron image as well as subjected to a wavelength dispersive line analysis.

Figure 1:
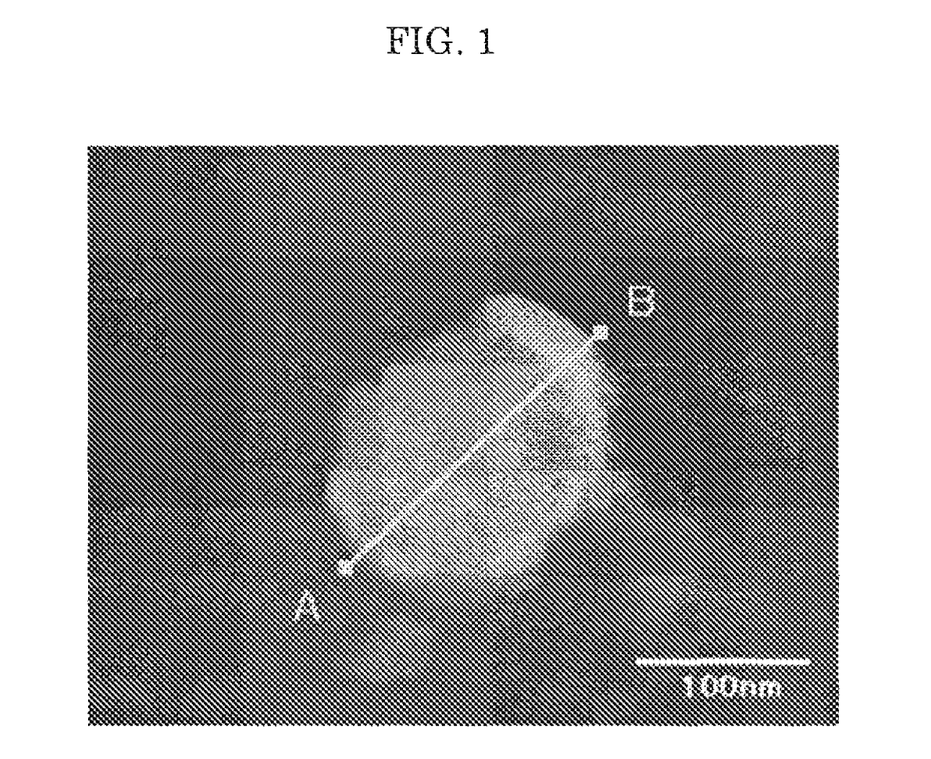
FIG. 1 shows a scanning electron microscope (SEM) photograph of a cross section of the surface-modified titanium dioxide particle of the invention obtained by using anatase titanium dioxide.
Figure 2:
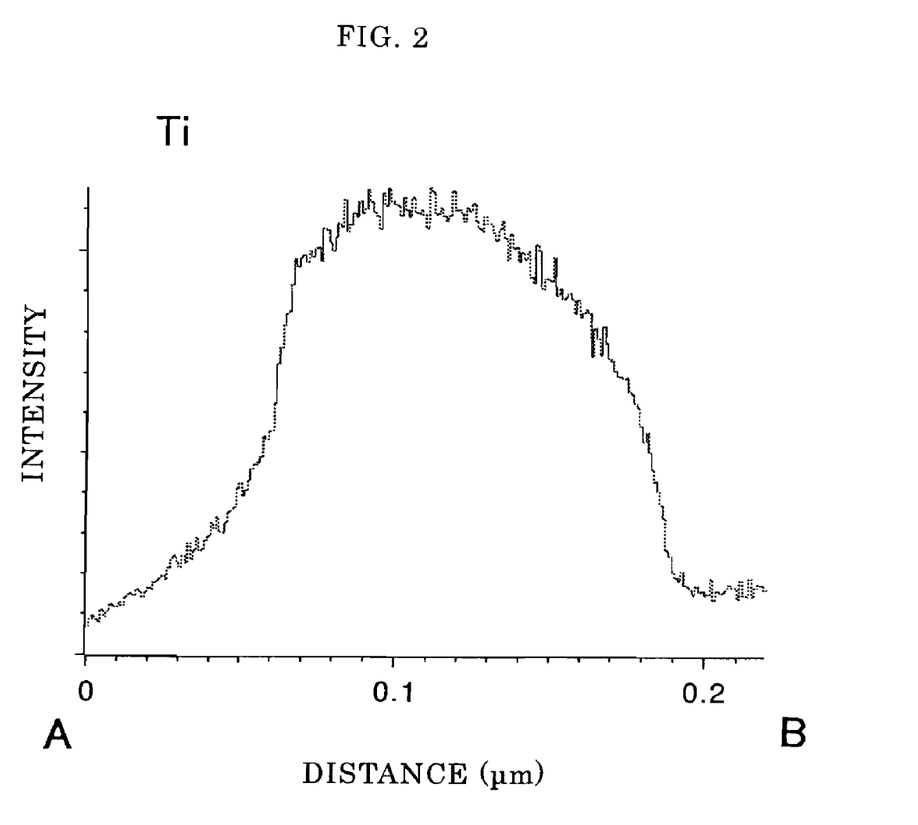
FIG. 2 shows a result of line analysis of titanium element of the surface-modified titanium dioxide particle of the invention.
Figure 3:
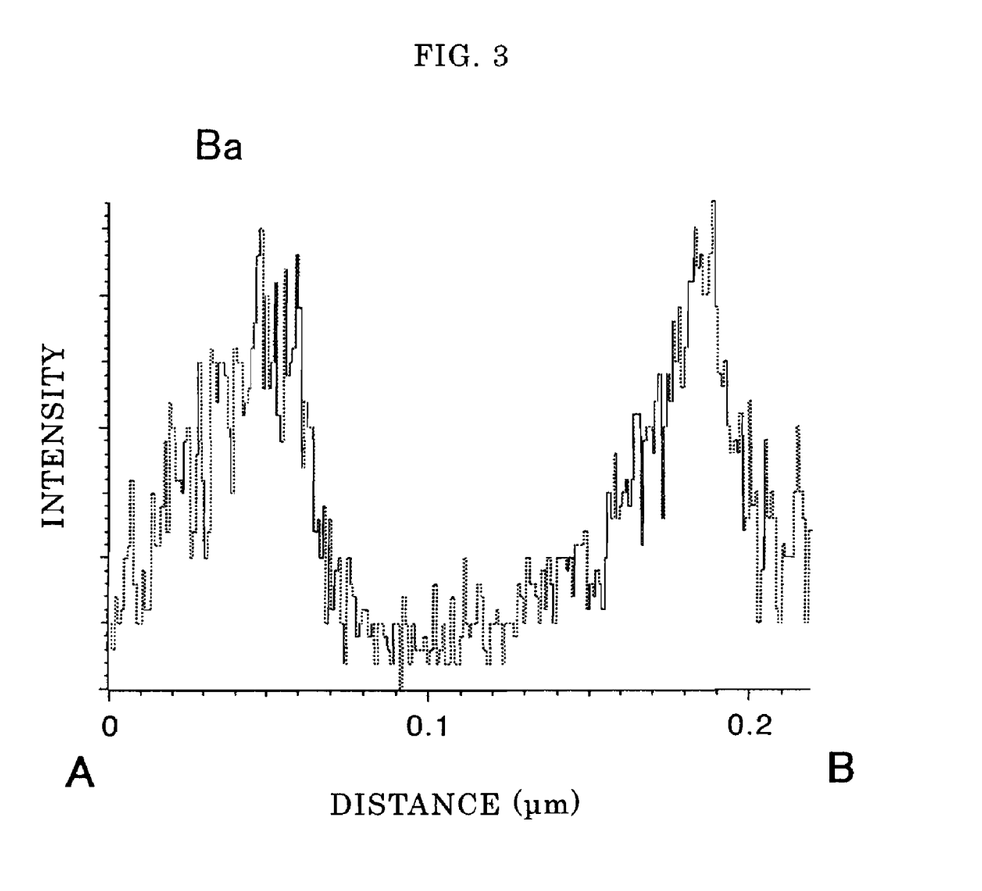
FIG. 3 shows a result of line analysis of barium element of the surface-modified titanium dioxide particle of the invention.

FIG. 1 shows an SEM image of the cross section of surface-modified titanium dioxide particle, FIG. 2 shows a result of line analysis of titanium element of surface-modified titanium dioxide particle, and FIG. 3 shows a result of line analysis of barium element. The results of the line analysis show that barium element is found on the surface of the particle, but not found in the core.

Figure 4:
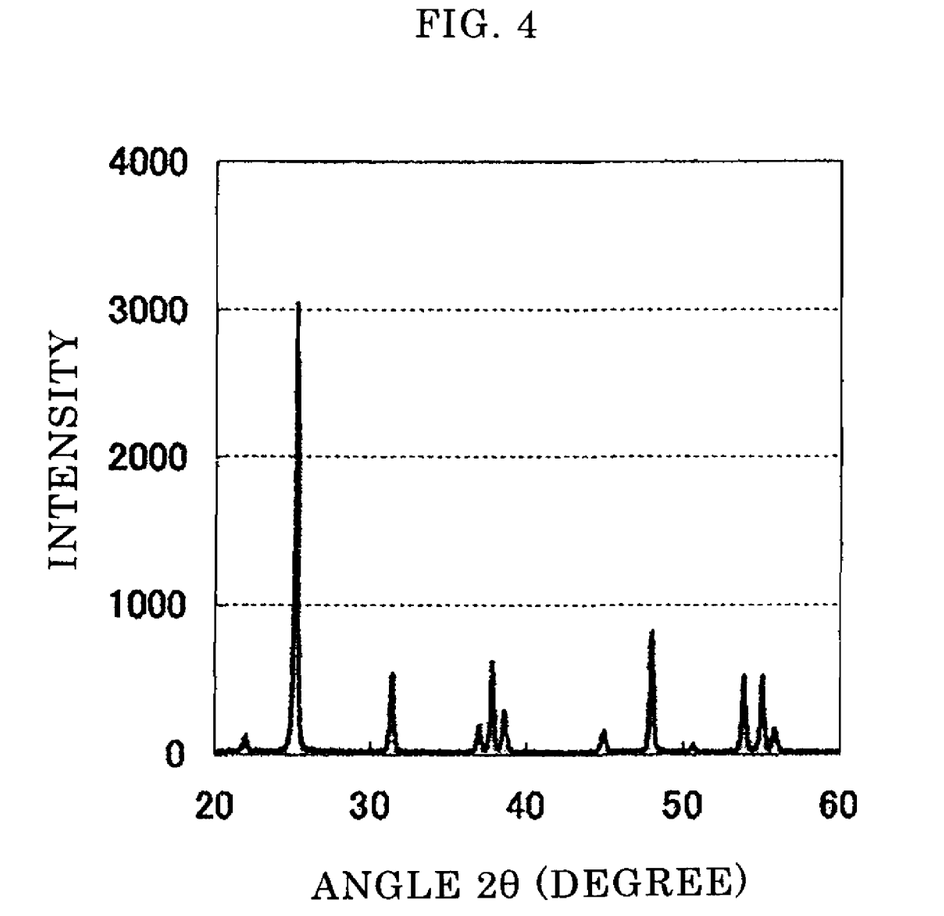
FIG. 4 shows a powder X-ray diffraction pattern of the surface-modified titanium dioxide particle of the invention.
Figure 5:
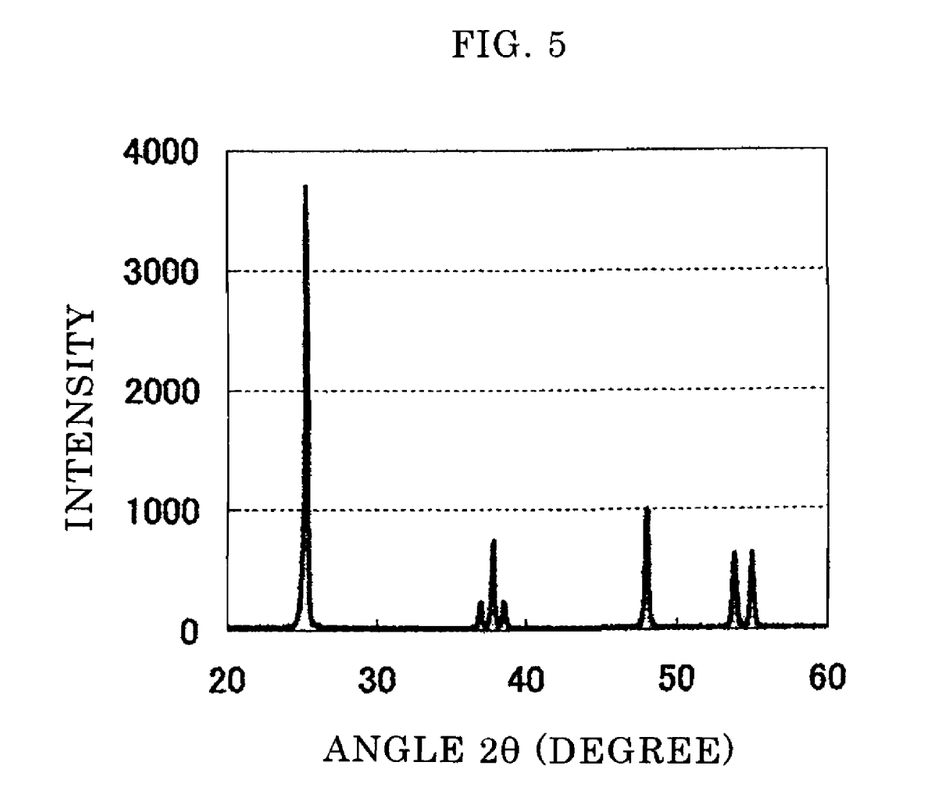
FIG. 5 shows a powder X-ray diffraction pattern of anatase titanium dioxide used as raw material for producing the surface-modified titanium dioxide particle of the invention.
Figure 6:
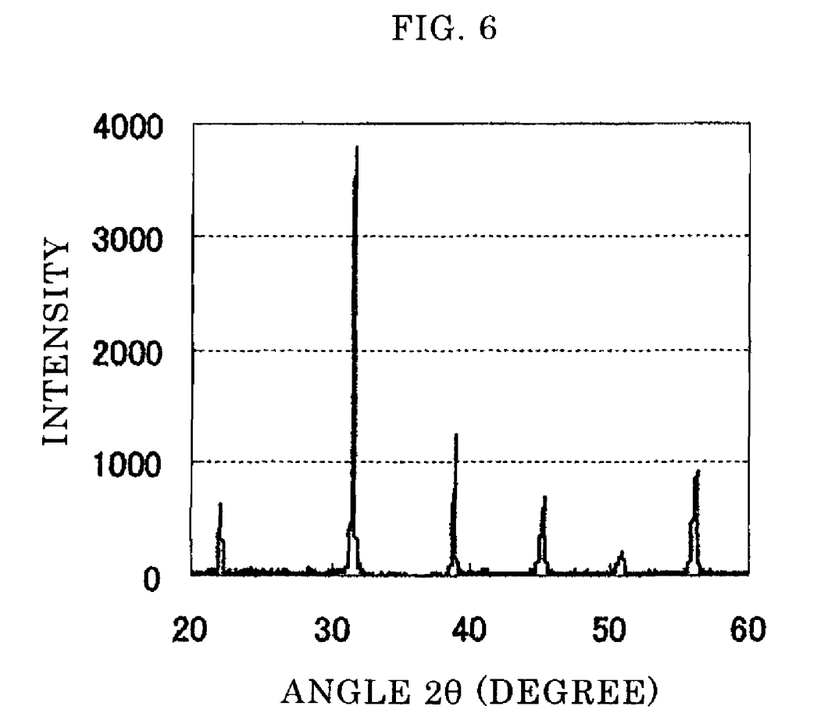
FIG. 6 shows a powder X-ray diffraction pattern of barium titanate particle.

FIG. 4 shows a powder X-ray diffraction pattern of the surface-modified titanium dioxide particle obtained above, FIG. 5 shows a powder X-ray diffraction pattern of anatase titanium dioxide used as the raw material, and FIG. 6 shows a powder X-ray diffraction pattern of barium titanate particles.

As shown in FIG. 5, the anatase titanium dioxide used as the raw material has a diffraction peak at $2\theta=25.3°$, and as shown in FIG. 6, barium titanate has a diffraction peak at $2\theta=31.4°$. The surface-modified titanium dioxide particle obtained according to the invention has the diffraction peak at $2\theta=25.3°$ derived from anatase titanium dioxide as well as the diffraction peak at $2\theta=31.4°$ derived from barium titanate.

Therefore, it is shown that the surface-modified titanium dioxide particle obtained according to the invention has on the surface barium titanate which is a crystalline composite compound formed by complexing of barium with titanium dioxide.

Example 2

100 g of anatase titanium dioxide having an average primary particle diameter of 0.15 μm and 70 g of barium hydroxide octahydrate were added to water to make a total volume of 2 L. The mixture was placed in a three necked flask having an internal volume of 3 L and reacted with thorough stirring under nitrogen gas atmosphere at a temperature of 100° C. at ordinary pressure for 24 hours. The resulting aqueous slurry containing the reaction product obtained was treated in the same manner as in Example 1 to obtain surface-modified titanium dioxide particles.

Example 3

100 g of anatase titanium dioxide having an average primary particle diameter of 0.15 μm, 70 g of barium hydroxide octahydrate and 60 mL of 30% by weight aqueous solution of sodium hydroxide were added to water to make a total volume of 2 L. The mixture was placed in a three necked flask having an internal volume of 3 L and reacted with thorough stirring under nitrogen gas atmosphere at a temperature of 60° C. at ordinary pressure for 24 hours. The resulting aqueous slurry containing the reaction product obtained was treated in the same manner as in Example 1 to obtain surface-modified titanium dioxide particles.

Example 4

75 g of anatase titanium dioxide having an average primary particle diameter of 0.15 μm, 13 g of anhydrous strontium chloride and 30 mL of 30% by weight aqueous solution of sodium hydroxide were added to water to make a total volume of 750 mL. The mixture was placed in an autoclave having an internal volume of 1 L and reacted with thorough stirring at a temperature of 150° C. and a pressure of 0.4 MPa for 5 hours. The resulting aqueous slurry containing the reaction product obtained was treated in the same manner as in Example 1 to obtain surface-modified titanium dioxide particles.

Example 5

75 g of anatase titanium dioxide having an average primary particle diameter of 0.20 μm, 12 g of calcium chloride dihydrate and 17 mL of 30% by weight aqueous solution of sodium hydroxide were added to water to make a total volume of 750 mL. The mixture was placed in an autoclave having an internal volume of 1 L and reacted with thorough stirring at a temperature of 150° C. and a pressure of 0.4 MPa for 5 hours. The resulting aqueous slurry containing the reaction product obtained was treated in the same manner as in Example 1 to obtain surface-modified titanium dioxide particles.

Example 6

10 mL of an aqueous solution containing 7 g of magnesium chloride hexahydrate was mixed with 50 g of anatase titanium dioxide having an average primary particle diameter of 0.20 μm. The resulting mixture was dried at 105° C., then heated to 900° C. at a rate of 200° C./hour under an air atmosphere, kept for 2 hours at the temperature, and then cooled to room temperature at a rate of 300° C./hour.

The powder obtained in this manner was pulverized using an automated mortar, repulped in aqueous acetic acid adjusted to pH 5.5, filtered using a Buchner funnel to remove excess alkaline earth metal ions, and then washed with water until the conductivity of filtrate became 100 μS or less to thoroughly remove remaining water soluble salts. Then the cake was dried at 105° C. to remove water, and then pulverized with a jet mill to obtain surface-modified titanium dioxide particles.

Comparative Example 1

Anatase titanium dioxide having an average primary particle diameter of 0.15 μm and with no surface-modification was used as a titanium dioxide particle according to Comparative Example 1.

Comparative Example 2

Anatase titanium dioxide having an average primary particle diameter of 0.15 μm was made to an aqueous slurry having a concentration of 400 g/L. With thorough stirring, an aqueous solution of sodium aluminate was added to the slurry in an amount of 1.5% by weight in terms of alumina in relation to the titanium dioxide, and then adjusted to pH 7.0 with sulfuric acid. The obtained slurry was filtered and washed with water to remove water soluble salts. The obtained cake was dried at 105° C. and pulverized with a jet mill to obtain surface-modified titanium dioxide particles having on the surface 1.5% by weight of hydrous oxide of aluminum in terms of oxide.

Comparative Example 3

100 g of anatase titanium dioxide having an average primary particle diameter of 0.15 μm and 5 g of barium hydroxide octahydrate were added to water to make a total volume of 2 L. The mixture was placed in a three necked flask having an internal volume of 3 L and reacted with thorough stirring under nitrogen gas atmosphere at a temperature of 90° C. at ordinary pressure for 5 hours. The resulting aqueous slurry containing the reaction product obtained was treated in the same manner as in Example 1 to obtain surface-modified titanium dioxide particles.

Comparative Example 4

80 g of anatase titanium dioxide having an average primary particle diameter of 0.15 μm was added to an aqueous solution containing 30 g of barium chloride dihydrate, followed by thorough mixing to provide an aqueous slurry. The slurry was dried at a temperature of 105° C. to remove water, and pulverized with a jet mill to obtain surface-modified titanium dioxide particles having on the surface amorphous composite compound of titanium and barium.

of aluminum, the surface-modified anatase titanium dioxide particle of the invention has a remarkably reduced amount of volatile water. Accordingly, a polyethylene film containing the surface-modified anatase titanium dioxide particle of the invention has neither lacing nor foaming on the surface and has excellent surface property.

When the amount of alkaline earth metal complexed with titanium dioxide on the surface of surface-modified titanium dioxide particle is less than 0.1% by weight in terms of oxide, the photocatalytic activity of titanium dioxide particle is not completely inhibited. Thus, a paint composition containing such insufficiently surface-modified titanium dioxide particles as a pigment provides coating film having low gloss retention and poor weather resistance, and furthermore, a polyethylene terephthalate resin sheet containing such insufficiently surface-modified titanium dioxide particles has poor light fastness.

An anatase titanium dioxide particle having on the surface coating of hydrous oxide of aluminum has a large amount of volatile water so that a polyethylene film containing such a titanium dioxide particle as a pigment has poor surface property.

An anatase titanium dioxide particle having on the surface coating of amorphous composite compound of titanium and barium also has a large amount of volatile water like the anatase titanium dioxide particle having on the surface coating of hydrous oxide of aluminum. Accordingly, a polyethyl-

TABLE 1

| | Heating condition | Amount of alkaline earth metal (% by weight in terms of oxide) | Crystal structure of composite compound | Gloss retention | Surface property of film | Light fastness of resin composition | Amount of volatile water (% by weight) | Tinting strength |
|---|---|---|---|---|---|---|---|---|
| Example 1 | Ba/150° C. × 5 h/ hydrothermal | 19.0 | BaTiO$_3$ | 0.43 | A | −1.0 | 0.29 | 100 |
| Example 2 | Ba/100° C. × 24 h/ ordinary pressure | 4.3 | BaTiO$_3$ | 0.39 | A | −3.2 | 0.19 | 117 |
| Example 3 | Ba/NaOH/60° C. × 24 h/ordinary pressure | 1.0 | BaTiO$_3$ | 0.24 | A | −3.6 | 0.20 | 120 |
| Example 4 | Sr/NaOH/150° C. × 5 h/ hydrothermal | 9.0 | SrTiO$_3$ | 0.38 | A | −3.3 | 0.29 | 109 |
| Example 5 | Ca/NaOH/150° C. × 5 h/hydrothermal | 3.0 | CaTiO$_3$ | 0.32 | A | −3.4 | 0.26 | 118 |
| Example 6 | Mg/900° C. × 2 h/ solid phase | 2.3 | MgTiO$_3$ | 0.30 | A | −3.5 | 0.18 | 119 |
| Comparative Example 1 | (Anatase TiO$_2$) | — | None | 0.02 | A | −5.0 | 0.45 | 120 |
| Comparative Example 2 | (Alumina-coated anatase TiO$_2$) | — | None | 0.08 | B | −4.7 | 1.15 | 123 |
| Comparative Example 3 | Ba/90° C. × 5 h/ ordinary pressure | 0.08 | None | 0.15 | A | −4.5 | 0.23 | 120 |
| Comparative Example 4 | (Amorphous compound-coated anatase TiO$_2$) | 19.0 | None | 0.25 | B | −3.65 | 0.49 | 90 |

The surface-modified anatase titanium dioxide particle of the invention possesses inhibited photocatalytic activity as compared with commonly known anatase titanium dioxide, and as a result, a paint composition containing the surface-modified anatase titanium dioxide particle of the invention as a pigment provides coating film having high gloss retention and excellent weather resistance. In addition, a polyethylene terephthalate resin sheet containing the surface-modified anatase titanium dioxide particle of the invention as a pigment has excellent light fastness.

Furthermore, the surface-modified anatase titanium dioxide particle of the invention has a small amount of volatile water. For example, as compared with a conventionally known titanium dioxide particle covered with hydrous oxide ene film containing such a titanium dioxide particle as a pigment has poor surface property.

B. Production of Surface-Modified Rutile Titanium Dioxide Particle and its Performance Example 1

100 g of rutile titanium dioxide having an average primary particle diameter of 0.18 μm, 63 g of barium hydroxide octahydrate and 60 mL of 30% by weight aqueous solution of sodium hydroxide were added to water to make a total volume of 1 L. The mixture was placed in a three necked flask having an internal volume of 3 L and reacted with thorough stirring under a nitrogen gas atmosphere at a temperature of 90° C. at ordinary pressure for 5 hours.

The resulting aqueous slurry containing the reaction product obtained was adjusted to pH 5.5, filtered using a Buchner funnel to remove excess alkaline earth metal ions, and then washed with water until the conductivity of filtrate became 100 μS or less to remove remaining water soluble salts. The cake obtained in this manner was dried at 105° C. to remove water, and then pulverized using a jet mill to obtain surface-modified titanium dioxide particles.

Figure 7:
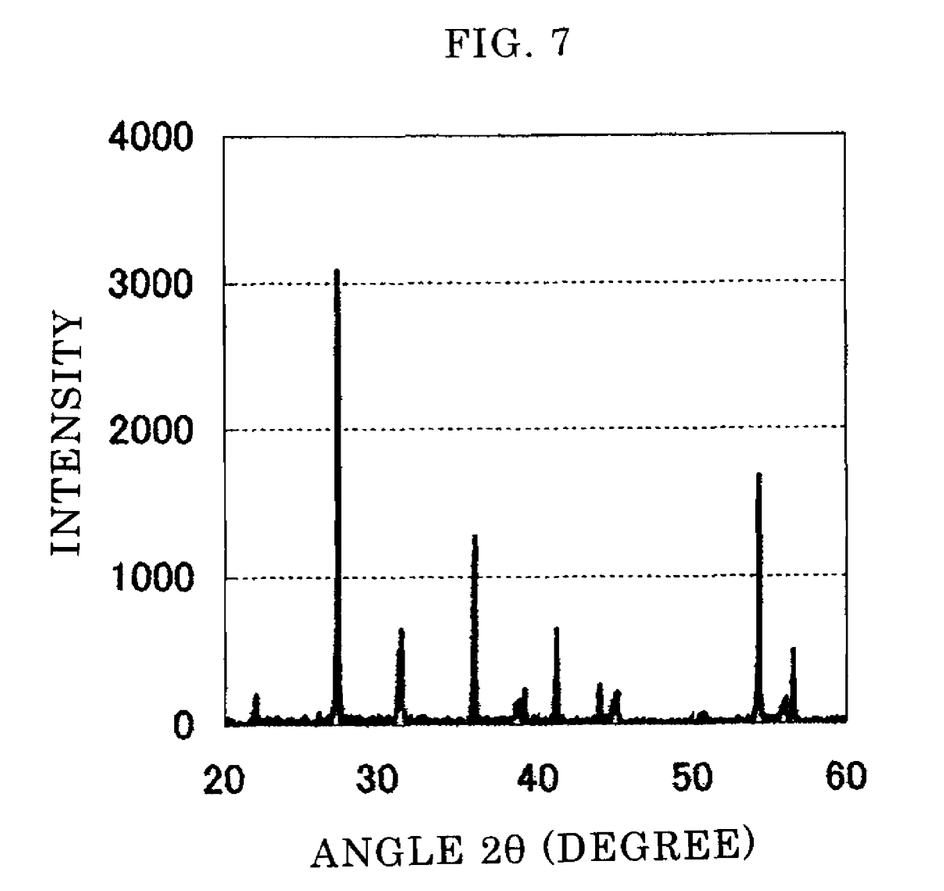
FIG. 7 shows a powder X-ray diffraction pattern of the surface-modified titanium dioxide particle of the invention obtained by using rutile titanium dioxide.
Figure 8:
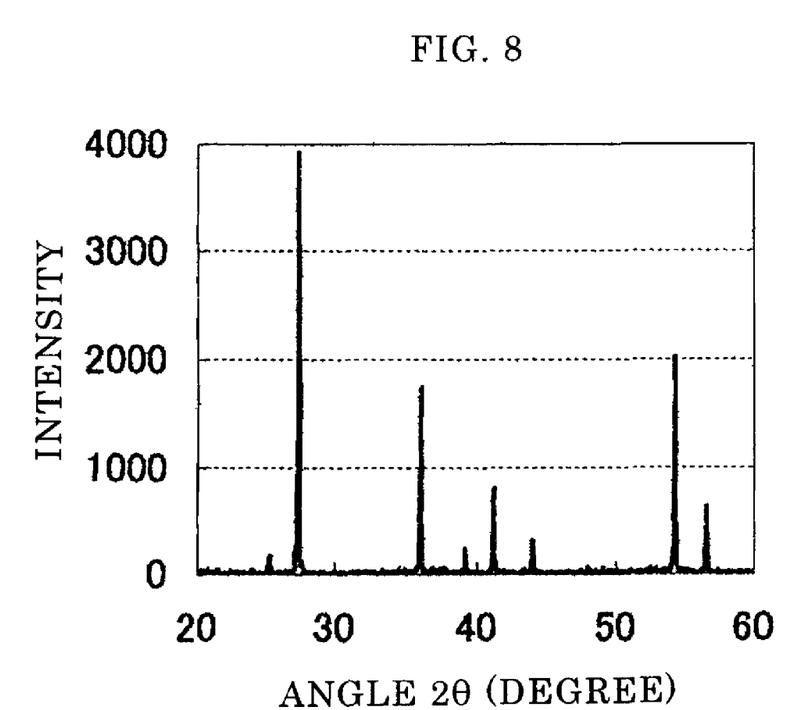
FIG. 8 shows a powder X-ray diffraction pattern of rutile titanium dioxide used as raw material for producing the surface-modified titanium dioxide particle of the invention.

FIG. 7 shows a powder X-ray diffraction pattern of the surface-modified titanium dioxide particle obtained in this manner, and FIG. 8 shows a powder X-ray diffraction pattern of rutile titanium dioxide used as the raw material.

As shown in FIG. 8, the rutile titanium dioxide used as the raw material has a diffraction peak at 2θ=27.4°, and as described above, barium titanate has a diffraction peak at 2θ=31.4°, as shown in FIG. 6. The surface-modified titanium dioxide particle obtained according to the invention has the diffraction peak at 2θ=27.4° derived from rutile titanium dioxide as well as the diffraction peak at 2θ=31.4° derived from barium titanate.

Thus, it is shown that the surface-modified titanium dioxide particle obtained according to the invention has on the surface barium titanate formed by complexing of barium with titanium dioxide.

Example 2

75 g of rutile titanium dioxide having an average primary particle diameter of 0.26 μm and 5 g of barium hydroxide octahydrate were added to water to make a total volume of 750 mL. The mixture was placed in an autoclave having an internal volume of 1 L and reacted with thorough stirring at a temperature of 120° C. and a pressure of 0.2 MPa for 5 hours. The resulting aqueous slurry containing the reaction product obtained was treated in the same manner as in Example 1 to obtain surface-modified titanium dioxide particles.

Example 3

75 g of rutile titanium dioxide having an average primary particle diameter of 0.26 μm, 13 g of anhydrous strontium chloride and 26 g of barium hydroxide octahydrate were added to water to make a total volume of 750 mL. The mixture was placed in an autoclave having an internal volume of 1 L and reacted with thorough stirring at a temperature of 150° C. and a pressure of 0.4 MPa for 5 hours. The resulting aqueous slurry containing the reaction product obtained was treated in the same manner as in Example 1 to obtain surface-modified titanium dioxide particles.

Example 4

10 mL of an aqueous solution containing 35 g of barium hydroxide octahydrate was mixed with 50 g of rutile titanium dioxide having an average primary particle diameter of 0.20 μm. The resulting mixture was dried at 105° C., then heated to 600° C. at a rate of 200° C./hour under an air atmosphere, kept for 4 hours at the temperature, and then cooled to room temperature at a rate of 300° C./hour.

The powder obtained in this manner was pulverized using an automated mortar, repulped in aqueous acetic acid adjusted to pH 5.5, filtered using a Buchner funnel to remove excess alkaline earth metal ions, and further washed with water until the conductivity of filtrate became 100 μS or less to thoroughly remove remaining water soluble salts. Then the cake was dried at 105° C. to remove water, and then pulverized using a jet mill to obtain surface-modified titanium dioxide particles.

Comparative Example 1

Rutile titanium dioxide having an average primary particle diameter of 0.20 μm and with no surface-modification was used as a titanium dioxide particle according to Comparative Example 1.

Comparative Example 2

85 g of rutile titanium dioxide having an average primary particle diameter of 0.20 μm was mixed with 15 g of barium titanate, and the resulting mixture was used as a titanium dioxide particle according to Comparative Example 2.

Comparative Example 3

Rutile titanium dioxide having an average primary particle diameter of 0.26 μm was made to an aqueous slurry having a concentration of 400 g/L. With thorough stirring, an aqueous solution of sodium aluminate was added to the slurry in an amount of 2.3% by weight in terms of alumina in relation to the titanium dioxide, and then adjusted to pH 7.0 with sulfuric acid. The obtained slurry was filtered and washed with water to remove water soluble salts. The obtained cake was dried at 105° C. and pulverized with a jet mill to obtain surface-modified titanium dioxide particles having on the surface 2.3% by weight of hydrous oxide of aluminum in terms of oxide.

Comparative Example 4

75 g of rutile titanium dioxide having an average primary particle diameter of 0.20 μm and 53 g of barium hydroxide octahydrate were added to water to make a total volume of 750 mL. The mixture was placed in an autoclave having an internal volume of 1 L and reacted with thorough stirring at a temperature of 150° C. and a pressure of 0.4 MPa for 5 hours. The resulting aqueous slurry containing the reaction product obtained was treated in the same manner as in Example 1 to obtain surface-modified titanium dioxide particles.

TABLE 2

|   | Heating condition | Amount of alkaline earth metal (% by weight in terms of oxide) | Crystal structure of composite compound | Gloss retention | Surface property of film | Light fastness of resin composition | Amount of volatile water (% by weight) | Tinting strength |
|---|---|---|---|---|---|---|---|---|
| Example 1 | Ba/NaOH/90° C. × 5 h/ordinary pressure | 3.6 | BaTiO$_3$ | 0.68 | A | −0.4 | 0.16 | 100 |
| Example 2 | Ba/120° C. × 5 h/hydrothermal | 0.3 | BaTiO$_3$ | 0.64 | A | −1.0 | 0.12 | 101 |
| Example 3 | Ba + Sr/150° C. × 5 h/hydrothermal | 10.0 | BaTiO$_3$ + SrTiO$_3$ | 0.71 | A | −0.8 | 0.44 | 93 |

TABLE 2-continued

|  | Heating condition | Amount of alkaline earth metal (% by weight in terms of oxide) | Crystal structure of composite compound | Gloss retention | Surface property of film | Light fastness of resin composition | Amount of volatile water (% by weight) | Tinting strength |
|---|---|---|---|---|---|---|---|---|
| Example 4 | Ba/600° C. × 4 h/ solid phase | 6.2 | BaTiO$_3$ | 0.70 | A | −0.6 | 0.12 | 95 |
| Comparative Example 1 | (rutile TiO$_2$) | — | None | 0.48 | A | −1.5 | 0.33 | 102 |
| Comparative Example 2 | (rutile TiO$_2$ + BaTiO$_3$) | 10.0 | None | 0.47 | A | −1.8 | 0.35 | 94 |
| Comparative Example 3 | (alumina-coated rutile TiO$_2$) | — | None | 0.74 | B | −0.5 | 1.50 | 107 |
| Comparative Example 4 | Ba/150° C. × 5 h/ hydrothermal | 23.0 | BaTiO$_3$ | 0.73 | A | −0.4 | 0.20 | 65 |

The surface-modified rutile titanium dioxide particle of the invention has inhibited photocatalytic activity as compared with commonly known rutile titanium dioxide, and as a result, a paint composition containing the surface-modified rutile titanium dioxide particle of the invention as a pigment provides a coating film having high gloss retention and excellent weather resistance. In addition, a polyethylene terephthalate resin sheet containing the surface-modified rutile titanium dioxide particle of the invention as a pigment has excellent light fastness. However, even if a mixture of rutile titanium dioxide and barium titanate is blended with a resin, the resulting resin composition is not improved in light fastness.

Furthermore, the surface-modified rutile titanium dioxide particle of the invention has a significantly smaller amount of volatile water as compared with, for example, a conventionally known titanium dioxide particle covered with hydrous oxide of aluminum. As a result, a polyethylene film containing the surface-modified rutile titanium dioxide particle of the invention has neither lacing nor foaming on the surface.

When the amount of alkaline earth metal carried on a surface-modified titanium dioxide particle is more than 20% by weight in terms of oxide, a paint composition containing such excessively surface-modified titanium dioxide particles as a pigment fails to have high tinting strength. Furthermore, in a similar way as an anatase titanium dioxide particle of which surface is covered with hydrous oxide of aluminum, a rutile titanium dioxide particle of which surface is covered with hydrous oxide of aluminum has a large amount of volatile water so that a polyethylene film containing such titanium dioxide particles as a pigment has poor surface property.

INDUSTRIAL APPLICABILITY

The surface-modified titanium dioxide particle of the invention has on the surface thereof a crystalline composite compound formed by complexing an alkaline earth metal with titanium dioxide and is hence inhibited in photocatalytic activity and reduced in amount of volatile water, and accordingly, it can be suitably used in paint compositions and resin compositions which require high weather resistance. For example, when the surface-modified titanium dioxide particle of the invention is used as a pigment in a paint composition, it provides the paint composition with a higher tinting strength than a conventional surface-modified titanium dioxide particle having on the surface an amorphous composite compound.

The invention claimed is:

1. A method for producing a surface-modified titanium dioxide particle, which comprises:
   heating a compound of barium and a titanium dioxide particle at a temperature of 110-300° C. in water so as to form a complex of the compound of barium with titanium dioxide in a form of a crystalline composite compound on a surface of the titanium dioxide particle, wherein an amount of the barium is in a range of 0.1-20% by weight on a basis of an oxide of the barium relative to weight of the surface-modified titanium dioxide particle.

2. The method according to claim 1, wherein the compound of barium is barium hydroxide.

3. A method according to claim 1, wherein the titanium dioxide particle is anatase titanium dioxide particle or rutile titanium dioxide particle.

* * * * *